US012180057B2

(12) United States Patent
Shin et al.

(10) Patent No.: US 12,180,057 B2
(45) Date of Patent: Dec. 31, 2024

(54) HOT WATER DISCHARGING APPARATUS

(71) Applicant: COWAY CO., LTD., Chungcheongnam-do (KR)

(72) Inventors: Hyun-Soo Shin, Seoul (KR); Chul-Ho Kim, Seoul (KR); Young-Hoon Hong, Seoul (KR); Hyoung-Min Moon, Seoul (KR); Si-Jun Park, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 225 days.

(21) Appl. No.: 17/770,694

(22) PCT Filed: Oct. 21, 2020

(86) PCT No.: PCT/KR2020/014402
§ 371 (c)(1),
(2) Date: Apr. 21, 2022

(87) PCT Pub. No.: WO2021/078592
PCT Pub. Date: May 6, 2021

(65) Prior Publication Data

US 2022/0371878 A1 Nov. 24, 2022

(30) Foreign Application Priority Data

Oct. 31, 2019 (KR) ........................ 10-2019-0137824

(51) Int. Cl.
*B67D 1/08* (2006.01)
*B67D 1/00* (2006.01)
*B67D 1/12* (2006.01)

(52) U.S. Cl.
CPC ......... *B67D 1/0895* (2013.01); *B67D 1/0014* (2013.01); *B67D 1/0081* (2013.01); *B67D 1/12* (2013.01); *B67D 2210/00062* (2013.01)

(58) Field of Classification Search
CPC .. B67D 1/0895; B67D 1/0014; B67D 1/0081; B67D 1/12; B67D 2210/00062
See application file for complete search history.

(56) References Cited

U.S. PATENT DOCUMENTS

2010/0212333 A1* 8/2010 Moon .................. B67D 1/0009 62/85
2010/0275779 A1 11/2010 Melikyan
(Continued)

FOREIGN PATENT DOCUMENTS

JP 2018065584 A 4/2018
KR 100900300 B1 6/2009
(Continued)

OTHER PUBLICATIONS

Machine translation of KR-100993891-B1.*
(Continued)

*Primary Examiner* — Jeremy Carroll
(74) *Attorney, Agent, or Firm* — Guntin & Gust, PLC; Miyoung Shin

(57) ABSTRACT

Disclosed is a hot water discharging apparatus. A hot water discharging apparatus according to an embodiment of the present invention comprises: a water heater for heating water that has flowed into hot water, and discharging the hot water; and a hot water discharge unit that is connected to the water heater so that the hot water discharged from the water heater is discharged to the outside, wherein the water heater is provided with an outlet through which the hot water is discharged, the hot water discharge unit includes a hot water discharge member connected to the outside so that the hot water is discharged to the outside, and the water heater may be disposed so that the outlet is located higher than the hot water discharge-side end of the hot water discharge member.

4 Claims, 3 Drawing Sheets

(56) References Cited

U.S. PATENT DOCUMENTS

| | | | | |
|---|---|---|---|---|
| 2016/0002021 A1* | 1/2016 | Orita | .................... | B67D 3/0038 222/146.5 |
| 2017/0320721 A1* | 11/2017 | Choi | ...................... | H05B 6/365 |

FOREIGN PATENT DOCUMENTS

| | | | |
|---|---|---|---|
| KR | 100993891 | B1 * | 11/2010 |
| KR | 101281303 | B1 | 7/2013 |
| KR | 101565928 | B1 | 11/2015 |
| KR | 1020170125560 | A | 11/2017 |
| KR | 101929180 | B1 | 12/2018 |

OTHER PUBLICATIONS

International Search Report issued in corresponding International Application No. PCT/KR2020/014402, mailed Jan. 20, 2021, 4 pages.

* cited by examiner

HOT WATER DISCHARGING APPARATUS

TECHNICAL FIELD

The present disclosure relates to a hot water discharging apparatus.

BACKGROUND ART

The hot water discharging apparatus is a device that makes hot water and discharges the hot water externally to be supplied to a user.

The hot water discharging apparatus includes a water heater heating inlet water to make hot water and discharging the hot water externally. In addition, the hot water discharging apparatus includes a hot water discharge member connected to the water heater to discharge the hot water from the water heater externally and supply the hot water to the user.

In the conventional hot water discharging apparatus, the water heater was disposed such that the side on which the hot water is discharged from the water heater is lower than the side on which the hot water is discharged from the hot water discharge member externally.

Accordingly, when the hot water is discharged from the water heater and discharged externally through the hot water discharge member, there was a case in which the hot water flowed in a direction opposite to gravity. As such, when the hot water discharged from the water heater flows in the direction opposite to gravity, the flow of the hot water is unstable. Accordingly, steam is separated from the hot water and the motion of the steam becomes active. Accordingly, when the hot water is discharged externally through the hot water discharge member, the hot water may be splashed, resulting in a safety accident, such as a burn, to a user.

SUMMARY OF INVENTION

Technical Problem

The present disclosure is provided in recognition of at least one of the needs or problems occurring in the related art as described above.

One aspect of the object of the present disclosure is to prevent a safety accident such as a user being burned by preventing the hot water from splashing when hot water is discharged externally.

Another aspect of the object of the present disclosure is to dispose a water heater such that an outlet provided in the water heater such that hot water is discharged from the water heater is positioned to be higher than the hot water discharge-side end of a hot water discharge member that is connected to the outlet to discharge the hot water externally.

Solution to Problem

The hot water discharging apparatus related to an embodiment for implementing at least one of the above subjects may include the following features.

According to an aspect of the present disclosure, a hot water discharging apparatus includes a water heater heating water having flowed in, producing hot water, and discharging the hot water; and a hot water discharge unit connected to the water heater to allow the hot water discharged from the water heater to be discharged externally, wherein the water heater is provided with an outlet through which the hot water is discharged, the hot water discharge unit includes a hot water discharge member connected externally to discharge the hot water externally, and the water heater is disposed such that the outlet is located higher than a hot water discharge-side end of the hot water discharge member.

In this case, the hot water discharge unit may further include a hot water discharge valve connected to the outlet and the hot water discharge member.

In addition, the hot water discharge unit may further include a connection pipe connected to the outlet and the hot water discharge valve.

In addition, the outlet and the connection pipe may be horizontally connected.

Further, the connection pipe may be horizontally disposed.

In addition, the hot water discharge valve may be located between the connection pipe and the hot water discharge-side end of the hot water discharge member.

Further, the hot water discharge valve may be provided with a first connector, and the connection pipe may be provided with a connecting portion to which the first connector is connected.

In addition, the hot water discharge valve may be provided with a second connector, and the hot water discharge unit may further include a flexible pipe connected to the second connector and the hot water discharge member.

Further, the second connector and the hot water discharge member may be provided with a fitting member to which the flexible pipe is connected, respectively.

Advantageous Effects of Invention

As described above, according to an embodiment of the present disclosure, a water heater is disposed such that an outlet provided in the water heater such that hot water is discharged from the water heater is positioned to be higher than the hot water discharge-side end of a hot water discharge member that is connected to the outlet to discharge the hot water externally.

In addition, according to an embodiment of the present disclosure, a safety accident such as a user being burned or the like may be prevented by preventing the hot water from splashing when hot water is discharged externally.

BEST MODE FOR INVENTION

Figure 1:
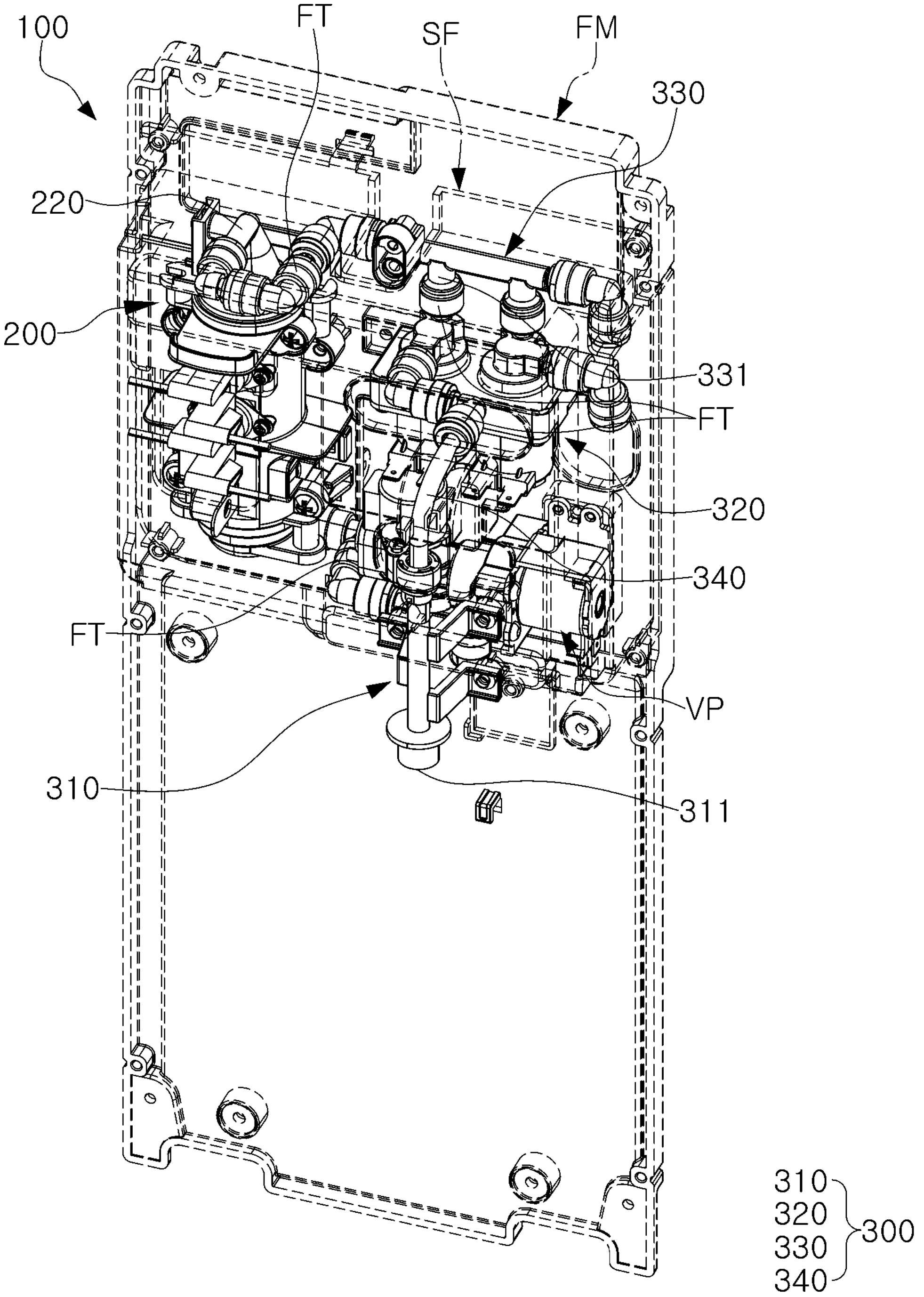
FIG. 1 is a perspective view of an embodiment of a hot water discharging apparatus according to the present disclosure.

In order to help the understanding of the features of the present disclosure as described above, the hot water discharging apparatus related to an embodiment of the present disclosure will be described in more detail below.

The embodiments described below will be described based on the most suitable embodiments for understanding the technical features of the present disclosure, and the technical features of the present disclosure are not limited by the described embodiments, but it is to illustrate that the present disclosure may be implemented as in the embodiments described below. Accordingly, the present disclosure is capable of various modifications within the technical scope of the present disclosure through the embodiments described below, and these modified embodiments will fall within the technical scope of the present disclosure. In addition, in the reference numerals in the accompanying drawings to help the understanding of the embodiments to be described below, related components among components that perform the same operation in respective embodiments are indicated by the same or extended numbers.

Hereinafter, an embodiment of a hot water discharging apparatus according to the present disclosure will be described with reference to FIGS. 1 to 3.

Figure 2:
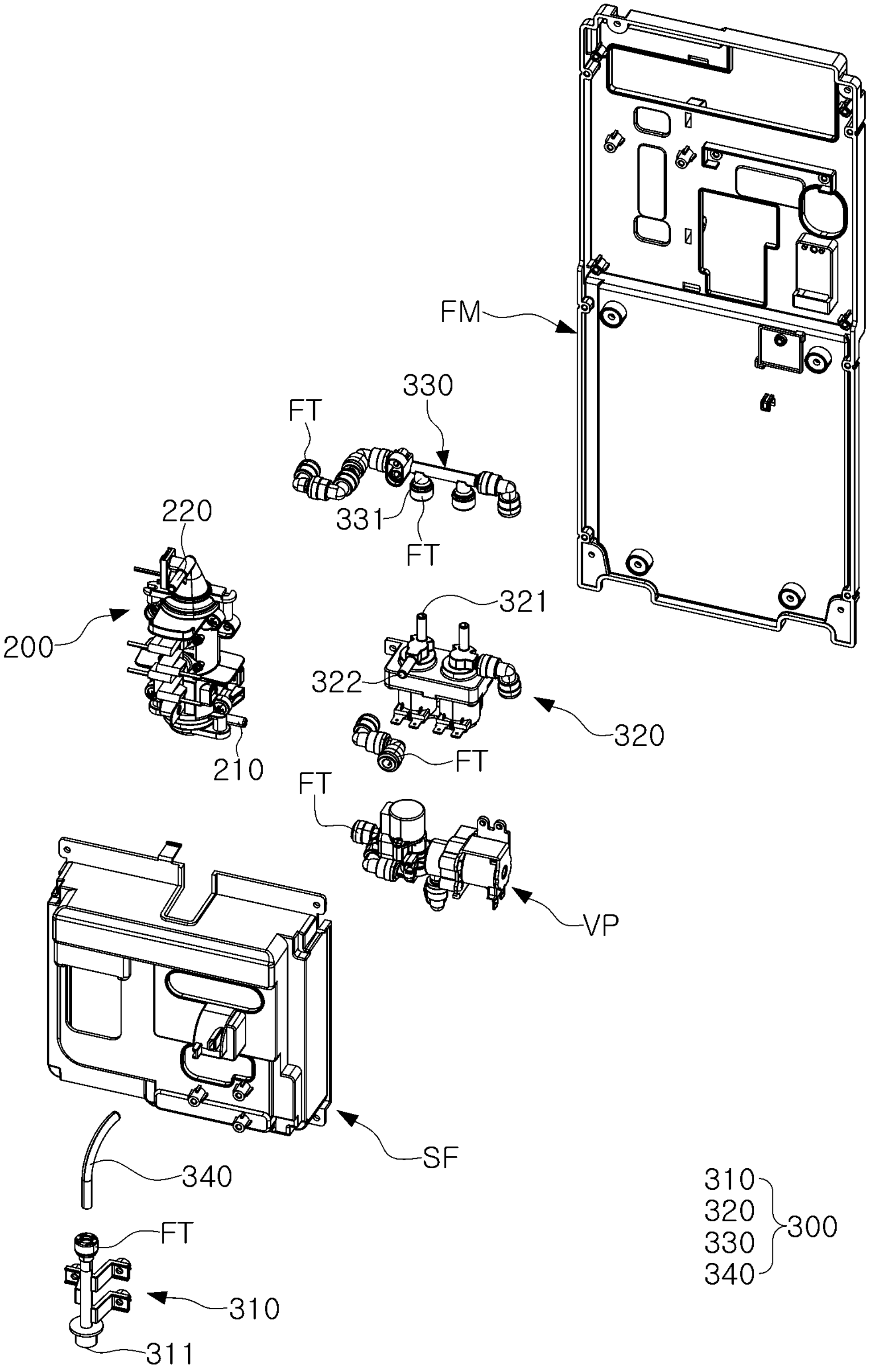
FIG. 2 is an exploded perspective view of an embodiment of a hot water discharging apparatus according to the present disclosure.
Figure 3:
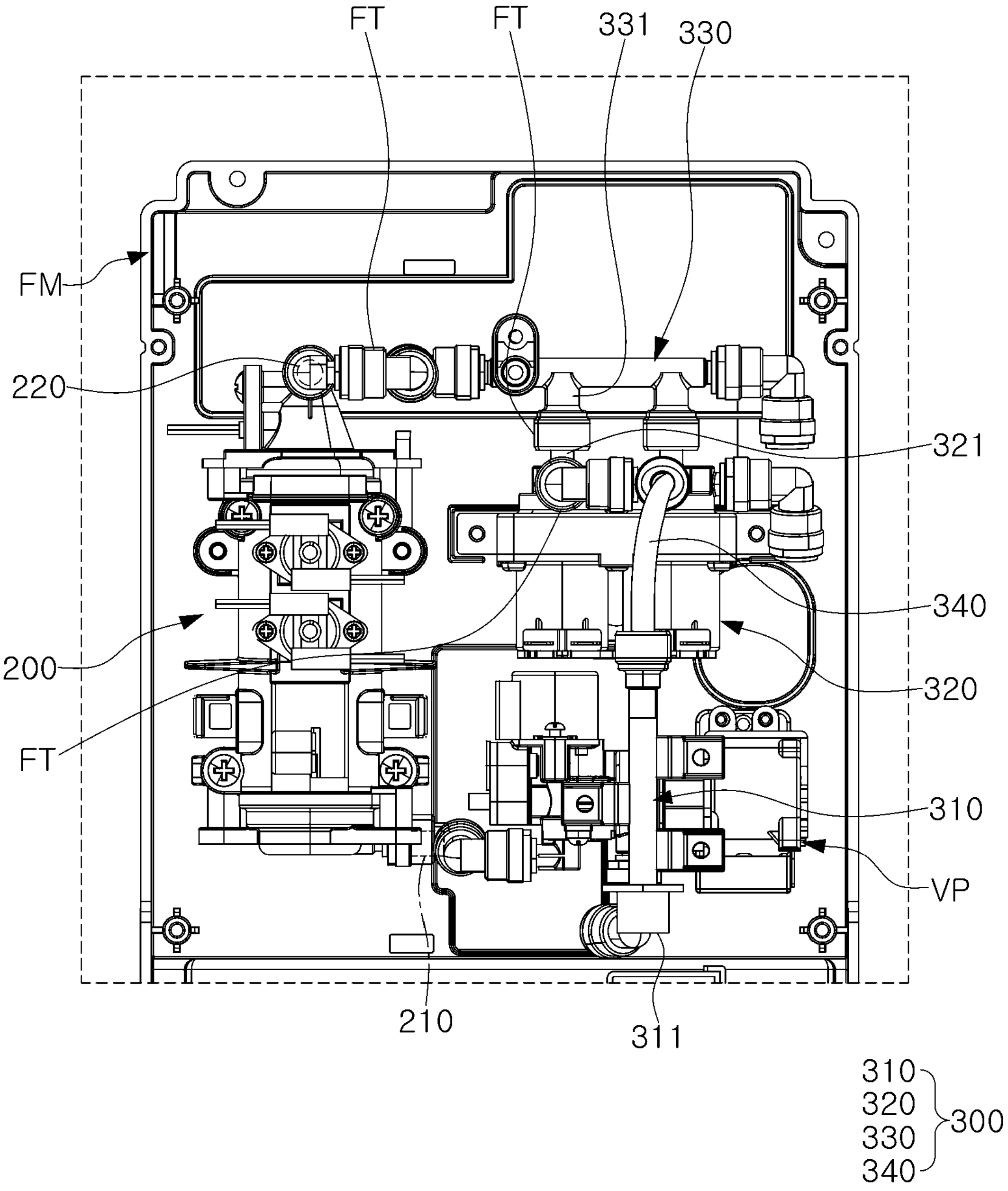
FIG. 3 is a front enlarged view of an embodiment of a hot water discharging apparatus according to the present disclosure.

FIG. 1 is a perspective view of an embodiment of a hot water discharging apparatus according to the present disclosure, FIG. 2 is an exploded perspective view of an embodiment of the hot water discharging apparatus according to the present disclosure, and FIG. 3 is an enlarged front view of an embodiment of the hot water discharging apparatus according to the present disclosure.

An embodiment of a hot water discharging apparatus 100 according to the present disclosure may include a water heater 200 and a hot water discharge unit 300.

The water heater 200 may heat the introduced water to make hot water and discharge the hot water.

The water heater 200 may be provided with an inlet 210 as illustrated in FIGS. 1 to 3. The inlet 210 may be connected to a water supply valve VP by a fitting member FT. In addition, the water supply valve VP may be connected to a water supply source (not illustrated) such as a water supply, a water tank or the like. Accordingly, when the water supply valve VP is opened, water from the water supply source may be introduced into the water heater 200 through the inlet 210.

The water heater 200 may be provided with a heating unit (not illustrated) for heating the introduced water. The power source is connected to the heating unit, and when electricity is applied to the heating unit from the power source, the heating unit may generate heat. As the heating unit generates heat as described above, the water flowing into the water heater 200 may be heated to become hot water. For example, a flow path (not illustrated) through which the introduced water flows is formed in the water heater 200, and the heating unit heats the water flowing through the flow path to make hot water. However, the configuration of the water heater 200 for generating hot water by heating the introduced water is not particularly limited, and any known configuration is possible.

The water heater 200 may be provided with an outlet 220. The hot water produced in the water heater 200 may be discharged through the outlet 220. For example, the outlet 220 may be connected to a flow path formed in the water heater 200. In addition, the hot water heated by the heating unit while flowing through the flow path of the water heater 200 may be discharged through the outlet 220.

As illustrated in FIG. 3, the water heater 200 may be disposed such that the outlet 220 is higher than a hot water discharge-side end 311 of a hot water discharge member 310 to be described later included in the hot water discharge unit 300. Accordingly, the hot water discharged through the outlet 220 of the water heater 200 does not flow in the opposite direction of gravity, but flows in the direction of gravity to be discharged externally. Thereby, since the flow of hot water may be stabilized, the hot water may not splash when discharged externally through the hot water discharge member 310. Therefore, when hot water is discharged externally, safety accidents such as splashing and burns to the user may be prevented.

For example, the water heater 200 may be provided on a frame member FM as illustrated in FIGS. 1 and 3. In addition, the hot water discharge member 310 of the hot water discharge unit 300 may be provided on an auxiliary frame member SF connected to the frame member FM. In this case, the water heater 200 may be disposed on the frame member FM such that the outlet 220 is positioned higher than the hot water discharge-side end 311 of the hot water discharge member 310 of the hot water discharge unit 300. However, the configuration in which the water heater 200 is disposed such that the outlet 220 is higher than the hot water discharge-side end 311 of the hot water discharge member 310 of the hot water discharge unit 300 is not particularly limited, and any known configuration may be used.

The hot water discharge unit 300 may be connected to the water heater 200. In addition, the hot water discharge unit 300 may allow the hot water discharged from the water heater 200 to be discharged externally. Accordingly, the hot water produced in the water heater 200 may be supplied to the user.

The hot water discharge unit 300 may include the hot water discharge member 310. Hot water may be discharged externally through the hot water discharge member 310. To this end, the hot water discharge member 310 may be connected externally. For example, the hot water discharge-side end 311 of the hot water discharge member 310 may be connected externally. In addition, the hot water may flow inside the hot water discharge member 310 and be discharged externally through the hot water discharge-side end 311 of the hot water discharge member 310.

The hot water discharge unit 300 may further include a hot water discharge valve 320. The hot water discharge valve 320 may be connected to the outlet 220 of the water heater 200 and the hot water discharge member 310. Accordingly, when the hot water discharge valve 320 is opened, the hot water produced in the water heater 200 may be discharged through the outlet 220 of the water heater 200 and supplied to the hot water discharge member 310. The hot water discharge valve 320 may be connected to the outlet 220 of the water heater 200 by a connection pipe 330 to be described later. In addition, the hot water discharge valve 320 may be connected to the hot water discharge member 310 by a flexible pipe 340 to be described later. However, the configuration in which the hot water discharge valve 320 is connected to the outlet 220 of the water heater 200 and the hot water discharge member 310 is not particularly limited, and any known configuration may be used.

The hot water discharge valve 320 may include a first connector 321 and a second connector 322 as illustrated in FIG. 3. The connection pipe 330 may be connected to the first connector 321. In addition, the flexible pipe 340 may be connected to the second connector 322.

The hot water discharge unit 300 may further include the connection pipe 330. The connection pipe 330 may be connected to the outlet 220 of the water heater 200 and the hot water discharge valve 320. The outlet 220 of the water heater 200 and the connection pipe 330 may be connected by the fitting member FT as illustrated in FIGS. 1 and 2. However, the configuration in which the outlet 220 of the water heater 200 and the connection pipe 330 are connected is not particularly limited, and any known configuration may be used.

The outlet 220 of the water heater 200 and the connection pipe 330 may be horizontally connected as illustrated in FIG. 3. Accordingly, the hot water discharged from the outlet 220 of the water heater 200 may flow horizontally and be introduced into the connection pipe 330. In addition, the connection pipe 330 may be horizontally disposed. Therefore, the hot water introduced into the connection pipe 330 may flow horizontally through the connection pipe 330. In this manner, since the hot water discharged from the outlet 220 of the water heater 200 horizontally flows a certain distance for a certain time, the flow of the hot water may be stabilized. Accordingly, the hot water may be prevented from splashing when it is discharged externally through the hot water discharge member 310.

On the other hand, the hot water discharge valve 320 may be located between the connection pipe 330 and the hot water discharge-side end 311 of the hot water discharge member 310. Accordingly, hot water discharged from the outlet 220 of the water heater 200 and flowing horizontally to the connection pipe 330 while having a stable flow may flow downwardly in the direction of gravity.

A connecting portion 331 may be provided in the connection pipe 330. The first connector 321 of the hot water discharge valve 320 may be connected to the connecting portion 331, and thus, the connection pipe 330 and the hot water discharge valve 320 may be connected to each other. For example, the connecting portion 331 may be provided with the fitting member FT. Accordingly, the first connector 321 of the hot water discharge valve 320 may be inserted into and connected to the fitting member FT provided in the connecting part 331. However, the configuration in which the connection pipe 330 and the hot water discharge valve 320 are connected is not particularly limited, and any known configuration may be used.

The hot water discharge unit 300 may further include the flexible pipe 340. The flexible pipe 340 may be connected to the second connector 322 of the hot water discharge valve 320 and the hot water discharge member 310. For example, the second connector 322 of the hot water discharge valve 320 and the hot water discharge member 310 may be provided with the fitting member FT, respectively. In addition, one side of the flexible pipe 340 may be connected to the fitting member FT provided in the second connector 322 of the hot water discharge valve 320, and the other side of the flexible pipe 340 may be connected to the fitting member FT provided in the hot water discharge member 310. Accordingly, the flexible pipe 340 may be connected to the second connector 322 of the hot water discharge valve 320 and the hot water discharge member 310 to form a gentle curve. Accordingly, when hot water is supplied from the hot water discharge valve 320 to the hot water discharge member 310 through the flexible pipe 340, the hot water may flow through the flexible pipe 340 in which the hot water forms a smooth curve. Thereby, frictional resistance is reduced when the hot water flows, such that the hot water may flow to the hot water discharge member 310 stably. In addition, when the hot water is discharged externally through the hot water discharge member 310, it may be prevented from splashing.

As described above, when the hot water discharging apparatus according to the present disclosure is used, the water heater may be disposed, such that the outlet provided in the water heater such that the hot water is discharged from the water heater is positioned higher than the hot water discharge-side end of the hot water discharge member that is connected to the outlet to discharge the hot water externally, and a safety accident such as a user being burned may be prevented by preventing the hot water from splashing when the hot water is discharged externally.

The hot water discharging apparatus described as above is not limited to the configuration of the above-described embodiment, but all or part of respective embodiments may be selectively combined and configured such that the above embodiments may be variously modifications.

The invention claimed is:

1. A hot water discharging apparatus comprising:

a water heater, heating water having flowed in, producing hot water, and discharging the hot water; and a connection pipe horizontally connected to an outlet of the water heater, wherein the connection pipe is disposed horizontally;

a hot water discharge unit connected to the outlet of the water heater to allow the hot water discharged from the water heater to be discharged externally;

a hot water discharge valve connected between the connection pipe and the hot water discharge unit; and a flexible pipe connected to the hot water discharge valve on one side and the hot water discharge unit on the other side, wherein the flexible pipe forms a curve while connected to the hot water discharge valve and the hot water discharge unit;

wherein the water heater is provided with the outlet through which the hot water is discharged, the hot water discharge unit includes a hot water discharge member connected externally to discharge the hot water externally, and the water heater is disposed such that the outlet is located higher than a hot water discharge-side end of the hot water discharge member, and wherein the hot water discharge valve is disposed to be located lower than the connection pipe, and the hot water discharge member is disposed to be located lower than the hot water discharge valve.

2. The hot water discharging apparatus of claim 1, wherein the hot water discharge valve is provided with a first connector, and the connection pipe is provided with a connecting portion to which the first connector is connected.

3. The hot water discharging apparatus of claim 2, wherein the hot water discharge valve is provided with a second connector, and the flexible pipe is connected to the second connector and the hot water discharge member.

4. The hot water discharging apparatus of claim 3, wherein the second connector and the hot water discharge member are provided with a fitting member to which the flexible pipe is connected, respectively.

* * * * *